Jan. 15, 1952 B. R. KAMLER 2,582,592
PHONOGRAPH MECHANISM
Filed Aug. 30, 1946 6 Sheets-Sheet 1

INVENTORS
Benedict R. Kamler
By: Wilkinson Huxley Byron & Knight
Attys.

INVENTOR.
Benedict R. Kamler
By:
Wilkinson Huxley Byron & Knight
Attys.

Jan. 15, 1952 B. R. KAMLER 2,582,592

PHONOGRAPH MECHANISM

Filed Aug. 30, 1946 6 Sheets-Sheet 3

INVENTOR.

Benedict R. Kamler

By: Wilkinson, Huxley, Byron & Knight

Att'ys.

INVENTOR.
Benedict R. Kamler
By: Wilkinson, Huxley, Byron & Knight
Att'ys.

Jan. 15, 1952 B. R. KAMLER 2,582,592

PHONOGRAPH MECHANISM

Filed Aug. 30, 1946 6 Sheets-Sheet 5

INVENTOR.

Benedict R. Kamler

By: Wilkinson Huxley Byron & Knight

Att'ys.

Jan. 15, 1952

B. R. KAMLER

PHONOGRAPH MECHANISM 2,582,592

Filed Aug. 30, 1946

6 Sheets-Sheet 6

INVENTOR.

Benedict R. Kamler

By: Wilkinson Huxley Byron & Knight
Att'ys.

Patented Jan. 15, 1952

2,582,592

UNITED STATES PATENT OFFICE 2,582,592

PHONOGRAPH MECHANISM

Benedict R. Kamler, South Haven, Mich., assignor to Edward Gray, Chicago, Ill.

Application August 30, 1946, Serial No. 693,832

9 Claims. (Cl. 274—9)

The invention relates to phonograph mechanism and has reference in particular to a record playing device having automatic means for protecting the records and the tone arm during periods of play and which said means can be employed in combination with record changing apparatus.

The record playing device of the invention has been designed to fulfill a definite need of dealers in records who are required to allow customers to handle their records and to manipulate whatever type of phonograph they have been able to provide. This is costly to dealers since the records are often damaged by careless customers who drop the tone arm on the record or scratch the same by failing to properly lift the arm following playing of the record. Also the needles are subject to damage and since a high quality needle must be used for the best reproduction this creates a temptation for the customer to appropriate the needle. The dealer is constantly checking his equipment and replacing damaged or stolen parts.

An object of the invention is to provide phonograph mechanism which will be automatic in the playing of a record after the same has been deposited on the turntable and which will provide means for protecting both the record and the tone arm during the playing period.

Another object of the invention resides in the provision of phonograph mechanism having novel means for actuating the tone arm and wherein the tone arm and record are automatically enclosed by canopy means for protection during playing, with the tone arm likewise being protected during non-playing periods so that the customer or operator is only required to change records.

Another object of the invention resides in the provision of phonograph mechanism which will incorporate canopy means as herein described for protection of the tone arm and records and which canopy means will have certain flexibility in structural design so that the canopy means may be adapted to various cabinets.

Another object resides in the provision of canopy means for phonograph mechanism which will have movement in a horizontal plane substantially parallel with the turntable for enclosing the tone arm and records during playing periods and which will be automatically positioned so as to protect only the tone arm during non-playing periods.

Another object of the invention resides in the provision of mechanism in combination with canopy means for a phonograph for automatically manipulating the tone arm of the phonograph and which mechanism will automatically position the tone arm for playing a ten or twelve inch record.

Another object of the invention is to provide canopy means including substantially semi-circular sections having movement in a horizontal plane for protection of the tone arm and records and wherein the horizontal movement of the canopy sections will be synchronized with movement of the tone arm.

With these and various other objects in view, the invention may consist of certain novel features of construction and operation, as will be more fully described and particularly pointed out in the specification, drawings and claims appended hereto.

In the drawings which illustrate an embodiment of the invention and wherein like reference characters are used to designate like parts—

Figure 1:
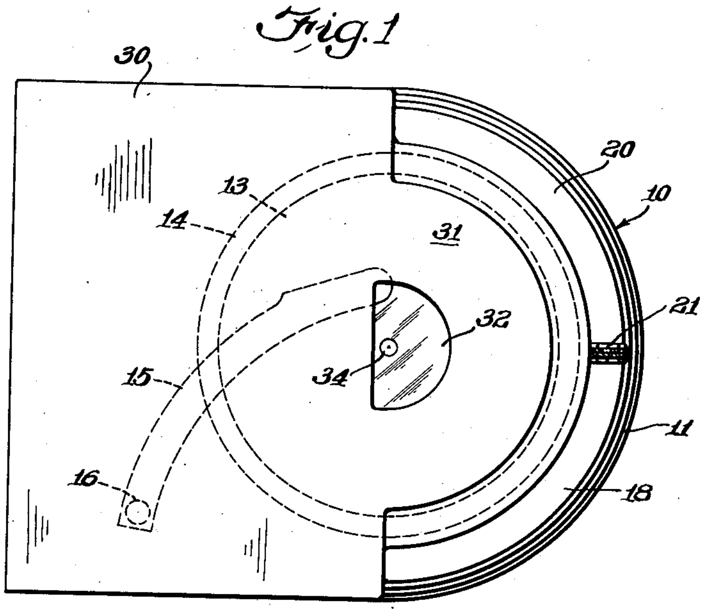
Figure 1 is a plan view illustrating a form of phonograph cabinet incorporating the canopy means of the invention.
Figure 2:
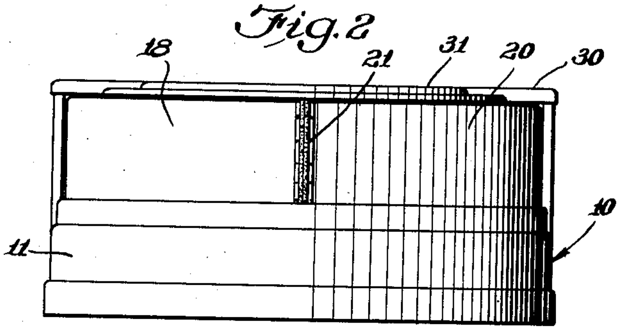
Figure 2 is a front elevational view of the phonograph cabinet shown in Figure 1 and which further illustrates the association therewith of the present design of canopy mechanism.
Figure 3:
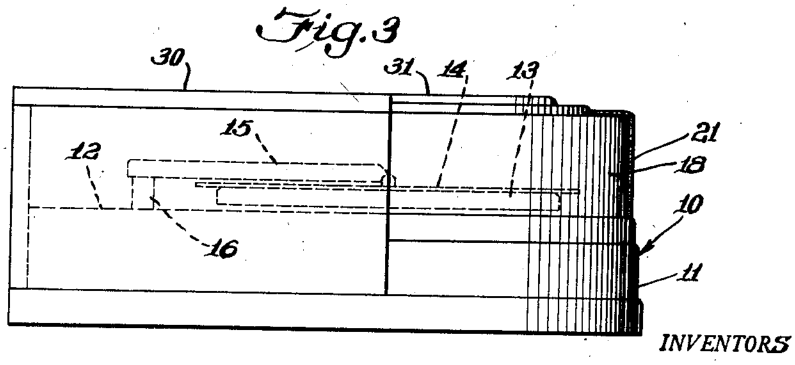
Figure 3 is a side elevational view of the phonograph cabinet as shown in Figures 1 and 2.

Referring to the drawings, particularly Figures 1, 2 and 3, the present invention is shown as embodied in a phonograph cabinet indicated by numeral 10 and which essentially consists of a base 11, the same providing an interior partition 12. The turntable 13 is located above partition 12 and within cabinet 10, the same providing the necessary support for the record 14. The tone arm 15 is likewise located within cabinet 10 adjacent the rear of the same and as a result of the swivel post 16 the tone arm is movably supported for coaction with the record 14 whereby playing of the record may be effected.

The invention provides canopy means for enclosing the turntable and records for protective purposes during playing periods. Said canopy is preferably formed of two semi-circular sections indicated by numerals 18 and 20. The canopy sections are suitably supported for rolling movement on the cabinet partition 12, which structure will be presently described in detail, and in addition, said canopy sections are provided with cushioning means 21 comprising rubber pads suitably fixed to adjacent ends of the canopy sections which have contacting relation when the sections are in closed relation. In operation the canopy sections have movement to and from an open and closed position, the said sections moving in a horizontal plane substantially parallel with that of the turntable and in an arcuate path to an extent whereby the sections completely enclose the turntable and tone arm during playing periods. When the phonograph is at rest, that is, during periods of non-play, the canopy sections assume an open position whereby the turntable and any record supported thereon are exposed and accessible to the operator with only the tone arm being protected.

Figures 4, 5, 6, 12:
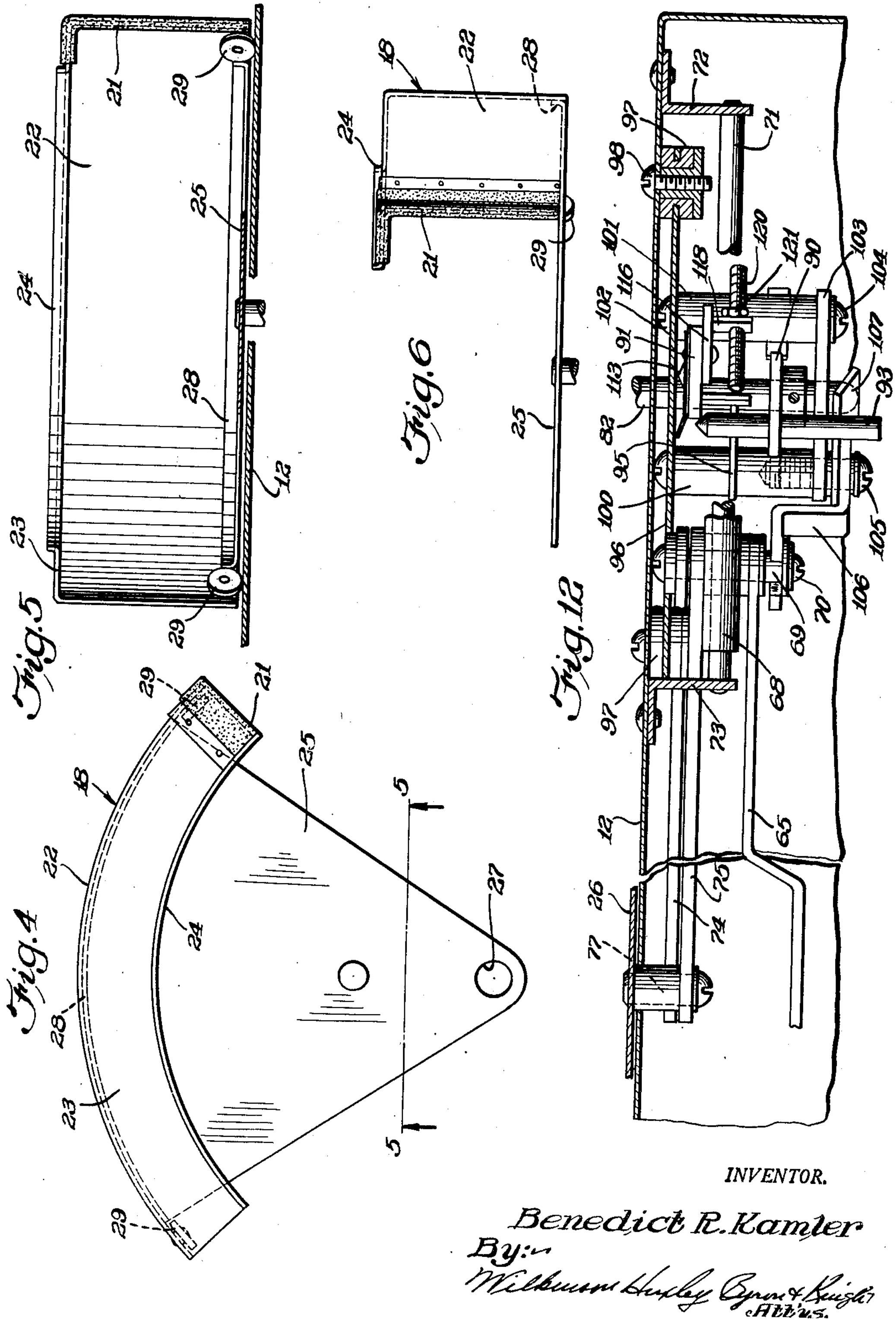
Figure 4 is a top plan view illustrating one semi-circular section of the canopy means of the invention.
Figure 5 is a vertical sectional view taken along line 5—5 of Figure 4 and which further illustrates the construction and manner of roller support for a single canopy section.
Figure 6 is a side elevational view of the single canopy section shown in Figures 4 and 5.
Figure 12 is another vertical sectional view further illustrating the tone arm elevating and oscillating mechanism.

Figures 4, 5 and 6 show the constructional details of a canopy section, it being understood that the sections are identical and that they are operated simultaneously and to a like extent for opening and closing the same. Section 18, which has been selected for illustration in Figures 4, 5 and 6, essentially consists of a semi-circular wall portion 22 and which extends in a vertical direction, the height of which is optional, depending on the type of record changing apparatus employed. Said vertical wall portion of the canopy section is provided with a top portion 23 which extends inwardly for a short distance and terminates in the upstanding flange 24 of circular extent. Each canopy section is suitably secured to a plate substantially wedge shaped, identified as 25 for section 18, and 26 for section 20, the apex of the wedge having an opening 27 with the outer circular edge of each plate having the upstanding flange 28 by means of which the plate is secured to the vertical wall 22 of the section. The plates 25 and 26 terminate short of their respective ends of the canopy section whereby space is provided for the rollers 29. The rollers contact the cabinet partition 12 and as a result each section is supported for rolling movement. The front edge of each canopy section adjacent front roller 29 is provided with resilient material 21, as previously indicated, and which may comprise sponge rubber or the like for the purpose of closing the gap between the sections when in closed relation. Also as a result of the rubber covered edge the sections close in a substantially noiseless manner and damage to the operator's fingers or the like is avoided in case the canopy sections should close upon them.

The cover for the cabinet may be associated with the canopy sections 18 and 20, as shown in Figures 1, 2 and 3. The cover essentially comprises member 30 having a vertically projecting ledge 31 of semi-circular contour and which may be stepped as clearly shown in Figures 2 and 3. The periphery of portion 31 interfits with the upstanding flange 24 of the sections, the said interfitting relation providing guiding means for the sections and the same further effectively preventing access to the interior of the cabinet such as would result in interference with the tone arm or record. For spotting the records on the turntable when the canopy sections are open the cover 30 may be provided with a central window such as 32.

Figures 8, 9:
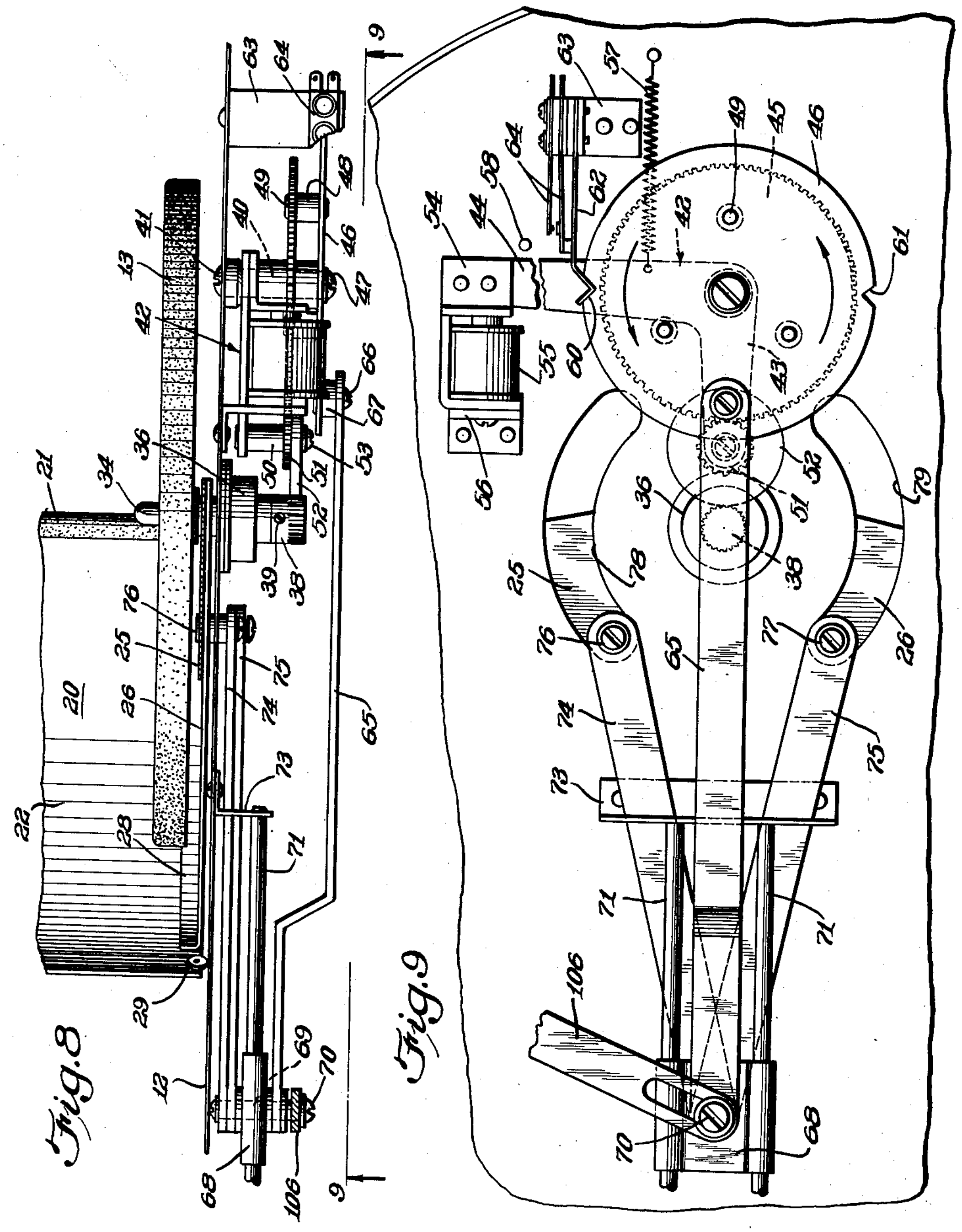
Figure 8 is a vertical sectional view showing the mechanism for effecting movement of the canopy sections.
Figure 9 is a bottom plan view substantially along line 9—9 of Figure 8, looking in the direction of the arrows, and which illustrates the position of the parts with the canopy sections in open position.
Figure 10:
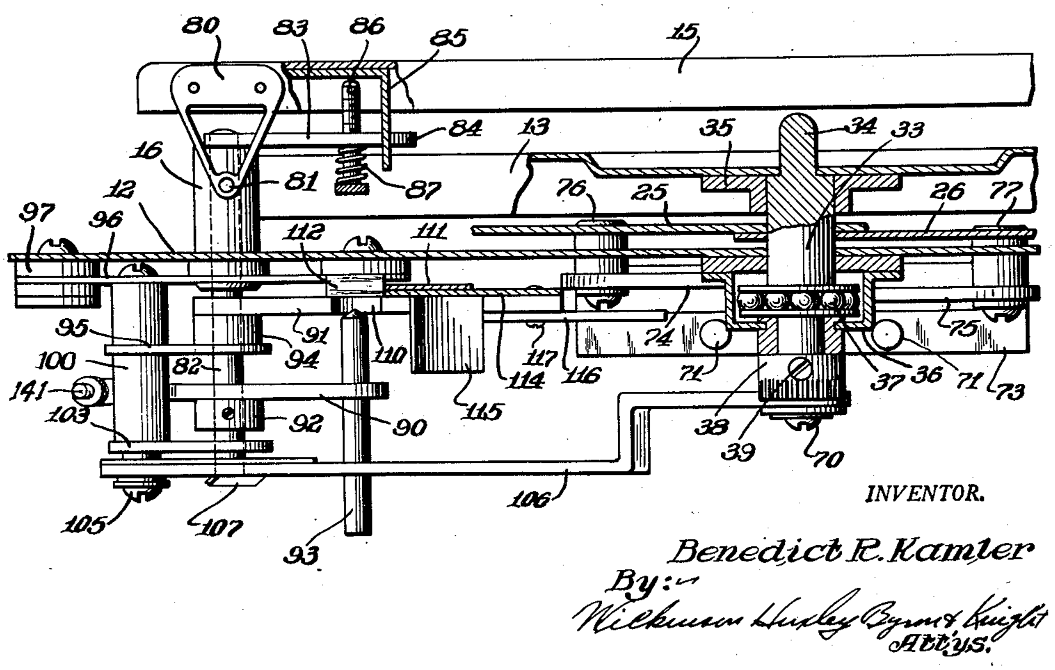
Figure 10 is a vertical sectional view illustrating the mechanism for elevating and oscillating the tone arm.

The central spindle or shaft for the turntable 13 is best shown in Figures 8 and 10. The said shaft, designated by numeral 33, extends through the turntable by means of the reduced portion 34 which is used for spotting and retaining the records on the turntable. The shaft is suitably fixed to the undersurface of the turntable by means of the collar 35 and said shaft extends through the partition 12 of the cabinet to depend below said partition and which depending portion is suitably journalled by bearing 36 supporting the ball bearing race 37 and which bearing is suitably secured to the undersurface of partition 12. A portion of shaft 33 extends below bearing 36 and the gear wheel 38 is fixedly secured to said depending portion by the set screw 39. It will be understood that the turntable shaft 33 and thus the turntable 13 will be rotated by an electric motor, not shown, and which may be employed in a manner to drive shaft 33 directly or to drive the turntable direct as in the case of a rim drive motor where the drive is preferably applied to the inside peripheral edge of the turntable.

The turntable shaft and more particularly the gear 38 constitutes the driving instrumentality for oscillating the canopy sections, a preferred embodiment of mechanism for effecting said operation of the canopy sections being shown in Figures 8, 9 and 10. The stud shaft 40 is suitably secured in depending relation to cabinet partition 12 as by means of the screw 41. Said stud shaft 40 provides journalling means for the lever 42 of right angle formation and which provides arms 43 and 44. The shaft 40 also journals a gear wheel 45 and the control disc 46 is retained in journalling relation on shaft 40 by screw 47. A number of collars 48 are located between the gear wheel 45 and the control disc 46, thus maintaining the parts in desired separated relation, and by means of the studs 49 extending through the collars the parts are connected together in fixed relation.

The arm 43 of lever 42 carries at its extremity the stud shaft 50 which provides journalling means for the pinion 51 and the friction wheel 52, the same being retained by screw 53. The pinion 51 is adapted to have meshing engagement with gear wheel 45, as shown in Figure 9, and although the lever 42 may be oscillated, it will be understood that meshing relation between the pinion and the gear is nevertheless maintained. The arm 44 of lever 42 carries at its extremity the armature 54 which is adapted to be attracted by magnet 55, the said magnet being supported in depending relation from the undersurface of partition 12 by means of bracket 56. The armature is in contact with said magnet, as shown in Figure 9, which has produced oscillation of lever 42 in a counterclockwise direction with the result that the friction wheel 52 is caused to engage the gear wheel 38. Gear wheel 38 has rotation with turntable 13 and thus power is supplied through friction wheel 52 and pinion 51 to gear 45 which causes rotation of control disc 46 fixedly secured thereto. When magnet 55 is de-energized the spring collar 57 exerts tension on lever 42 to produce clockwise rotation of the lever to an extent which will bring arm 44 into contact with stop 58. This will disconnect the drive between the friction wheel 52 and gear 38 and the parts are retained in this position by spring 57 and stop 58 until the magnet is again energized.

The control disc 46 is provided with two notches displaced 180 degrees and which are identified by numerals 60 and 61. The switch member 62 is adapted to coact with said notches, said switch member being suitably supported from the cabinet partition 12 by means of the bracket 63. The bracket also supports the switch contacts 64 and which have associated relation with the member 62. The switch contacts 64 are normally open so that the circuit to magnet 55 is open and the magnet is de-energized. When the operator pushes the start button he initially energizes magnet 55 and as a result of rotation of control disc 46 member 62 is displaced by movement of notch 60 so that switch contacts 64 are closed and the circuit to magnet 55 is held closed until notch 61 coacts with the end of member 62. This effects opening of switch contact 64, whereupon magnet 55 is de-energized and lever 42 is rotated by spring 57 so as to disconnect driving relation between friction wheel 52 and the turntable gear 38. Operation of the parts as above described is such as to result in rotation of control disc 46 for a half revolution. When the control disc is rotated a half revolution to start the playing of a record the canopy sections are caused to close and in a similar manner the sections are caused to open by the next half revolution of the control disc which locates the parts in their initial position with the tone arm at rest.

Mechanism for producing oscillating movement of the canopy sections includes the drive rod 65 which is pivotally secured to disc 46 by means of the threaded stud 66, the collar 67 being interposed between the parts to maintain them in proper separated relation. The other end of drive rod 65 is pivotally secured to the carriage 68. Pivotal connection of drive rod 65 to the carriage is effected by stud shaft 69 with screw 70 retaining the parts to the shaft. The carriage 68 is supported for movement on the rods 71, the said rods being retained in parallel relation with the partition 12 by the depending brackets 72 and 73. The levers 74 and 75 are pivotally secured at one end to the carriage 68, the said stud 69 extending through and above the carriage for this purpose. At their other end each lever is pivotally secured to a plate comprising an element of the canopy sections. Accordingly, lever 74 is pivotally secured by stud 76 to plate 25, whereas lever 75 is secured by means of stud 77 to plate 26. The studs have location within arcuate slots 78 and 79, and which have an arcuate length sufficient to allow the canopy sections to assume a complete closed and open position. Levers 74 and 75 pass through bracket 73 whereby said levers are supported intermediate their length. The plates 25 and 26 are movably associated with each other and with respect to stud 33 as an axis since said stud passes through the opening 27 in the apex of each plate. The plates therefore have movement about the said turntable shaft as a vertical axis with the outer periphery of the plates and also each canopy section being supported for rolling movement by the wheels 29. Each half revolution of the control disc 46 will thus actuate drive rod 65 from one dead center position to its other dead center position, effecting full reciprocation of the carriage 68 and actuation of levers 74 and 75 to cause oscillating movement of plates 25 and 26 and their associated canopy sections 18 and 20.

Figure 11:
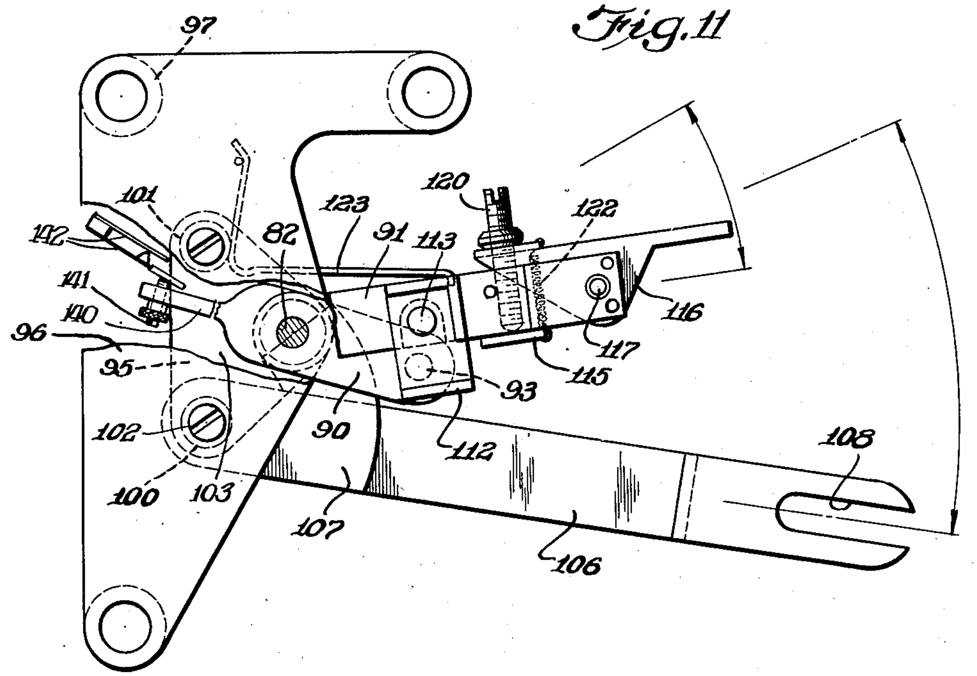
Figure 11 is a top plan view of the tone arm elevating and oscillating mechanism as shown in Figure 10.

The oscillating and elevating means for the tone arm 15 is best shown in Figures 10, 11 and 12. The tone arm is supported on the swivel post 16 by means of bracket 80 secured at its upper extremity to the tone arm and having pivotal connection on a horizontal axis at 81 with the swivel post 16. Said post is supported by the cabinet partition 12 in a manner permitting rotation of the swivel post on a vertical axis. The rod 82 extends vertically through the swivel post having the arm 83 fixedly secured to the end projecting above said post and which arm is located directly below and in substantial alignment with tone arm 15. The outer end of the arm 83 is reduced in width as at 84 so as to project through a slot in bracket 85 fixed to tone arm 15 and depending downwardly of the tone arm. When rod 82 is rotated said movement is imparted to arm 83 and through bracket 85 to the tone arm. When rod 82 is elevated arm 83 is likewise elevated, the said movement being imparted to tone arm 15 by means of the threaded stud 86 retained by the arm 83. Said stud is vertically adjustable and is held in desired position by the coil spring 87.

The section of rod 82 depending below swivel post 16 and partition 12 is provided with a pair of levers 90 and 91. Lever 90 is fixed to collar 92 on the rod 82 and which collar is suitably pinned or otherwise secured to said rod so as to rotate therewith. The outer extremity of lever 90 carries the pin 93 and which is instrumental in effecting oscillating movement of the tone arm from a position of rest to its initial starting position on the record. The lever 91 is fixed to collar 94 on rod 82 and which has movement independently of the rod so that rotation of the rod or elevation of the same is not imparted to lever 91. The collar 94 is supported in proper vertical position on rod 82 by means of the triangular plate 95. Said plate comprises part of the supporting structure located on the underside of partition 12 and which includes the main supporting plate 96 resiliently supported by the rubber cushioned supports 97 from the partition member 12. The screws 98 are employed to retain the cushioned supports in place.

The plate 96 provides a support for the depending studs 100 and 101, the same being secured to the plate so as to depend from the underside of the same by screws 102. These studs support the triangular plate 95 which is located intermediate the length of the studs, and they also support at their lower extremity a second plate 103, the same being secured to stud 100 by the screw 104. The screw 105 not only retains plate 103 in place but also provides means for pivotally supporting the arm 106. At this pivotally supported end of arm 106 the same carries an elevating plate 107 which has associated relation with the rod 82 to effect elevating movement of the rod as a result of movement of arm 106 in a certain direction.

When the arm has rotated to the position shown in Figure 11, the rod 82 is released and the same descends to an extent where arm 83 rests on top of the swivel post 16. The opposite end of arm 106 is slotted, as best shown in Figure 11, the slot being indicated by numeral 108. The slot receives the stud shaft 69 depending from and carried by the carriage 68 so that reciprocating movement of the carriage produces oscillation of arm 106 about screw 105 as an axis. Figure 11 illustrates the two extreme positions of arm 106, the position as shown in the figure being that position when carriage 68 is located forwardly of the supporting rod 71 and adjacent to the front bracket 73. The canopy sections are closed when the carriage 68 is so located and the turntable is rotating for playing the record supported thereon. With arm 106 so positioned, the elevating plate 107 is out of contact with rod 82 so that the rod assumes its lowered position, lowering arm 83 to effect disengagement of the adjusting screw 86 with respect to the tone arm. The tone arm is thus free to move over the record as required during playing of the same.

The lever 91 is formed with a slot 110 and which is provided for receiving the pin 93. A member 111 is suitably secured to the top surface of lever 91, having overlying relation with the slot 110, and which member has an extension 112 formed to provide an upturned lip which normally overlies pin 93 so as to allow the pin to be gradually forced under member 111 and into slot 110, this action taking place when the pin 93 has been elevated by the elevating plate 107. Member 111 is also formed with a detent 113 adapted to receive the pointed end of the pin when the same is so elevated and which effects an interlocking between the pin 93 and the arm 91 to which member 111 is secured. A second member 114 is also fixedly secured to lever 91, the said member providing the depending flange 115. A control member 116 is pivoted to the underside of lever 91 by means of the screw 117, said control member providing a depending part 118 which carries the threaded screw 120 locked in adjusted position on part 118 by the nut 121. The coil spring 122, Figure 11, is secured at its respective ends to part 118 and depending flange 115 and said spring functions to resiliently bias the control member 116 in a counterclockwise direction on lever 91. As a result of the tension applied by the coil spring the adjusting screw 120 is maintained in contact with said flange 115. In effect the control member 116 comprises a pivoted extension of lever 91 and which may be adjustably positioned with respect to said lever by adjusting screw 120. The flat spring member 123, suitably supported by the main plate 96, is associated with the lever 91, having contact therewith at its free end so as to apply tension to said lever to effect rotation of the same in a clockwise direction, Figure 11.

In said Figure 11 the arm 106 is shown in the position it assumes during the playing of a record with the canopy sections in closed relation so that the record and tone arm are protected from interference by the operator. The lever 91 is shown in said figure in the position it assumes when the playing of a record is finished. It will be observed that pin 93 is in spaced relation with respect to arm 106 which is necessary in order to allow said arm to rotate counterclockwise the necessary distance to cause the elevating plate to engage the lower depending end of rod 82, elevating the rod and effecting lifting of the tone arm. As a result of reciprocating movement of carriage 68 in a rearward direction to cause opening of the canopy sections, arm 106 will be rotated in said counterclockwise direction and immediately following elevation of rod 82 the arm will contact pin 93 to cause counterclockwise rotation of lever 90, rod 82, arm 83, and the tone arm, which is now in elevated position, having been lifted from the record by the elevating action of said rod 82. This counterclockwise rotation of the assembly is the result of pin 93 moving under the lip 112 and eventually into the detent 113. The lever 91 is releasably locked to the pin 93 and oscillating movement of arm 106 is thereupon transmitted to the lever. It will be understood that the counterclockwise rotation of lever 91 takes place against the tension of the flat spring 123, the said rotation locating the tone arm in a position of rest and also locating lever 91 in a position whereby return of the lever, that is, clockwise rotation, may take place for the purpose of returning the tone arm for playing a record. The locating of the tone arm is automatic, the control member 116 in combination with other elements functioning to determine the initial location of the tone arm for playing either a ten or twelve inch record. This mechanism which operates in conjunction with control member 116 will now be described.

Figure 7:
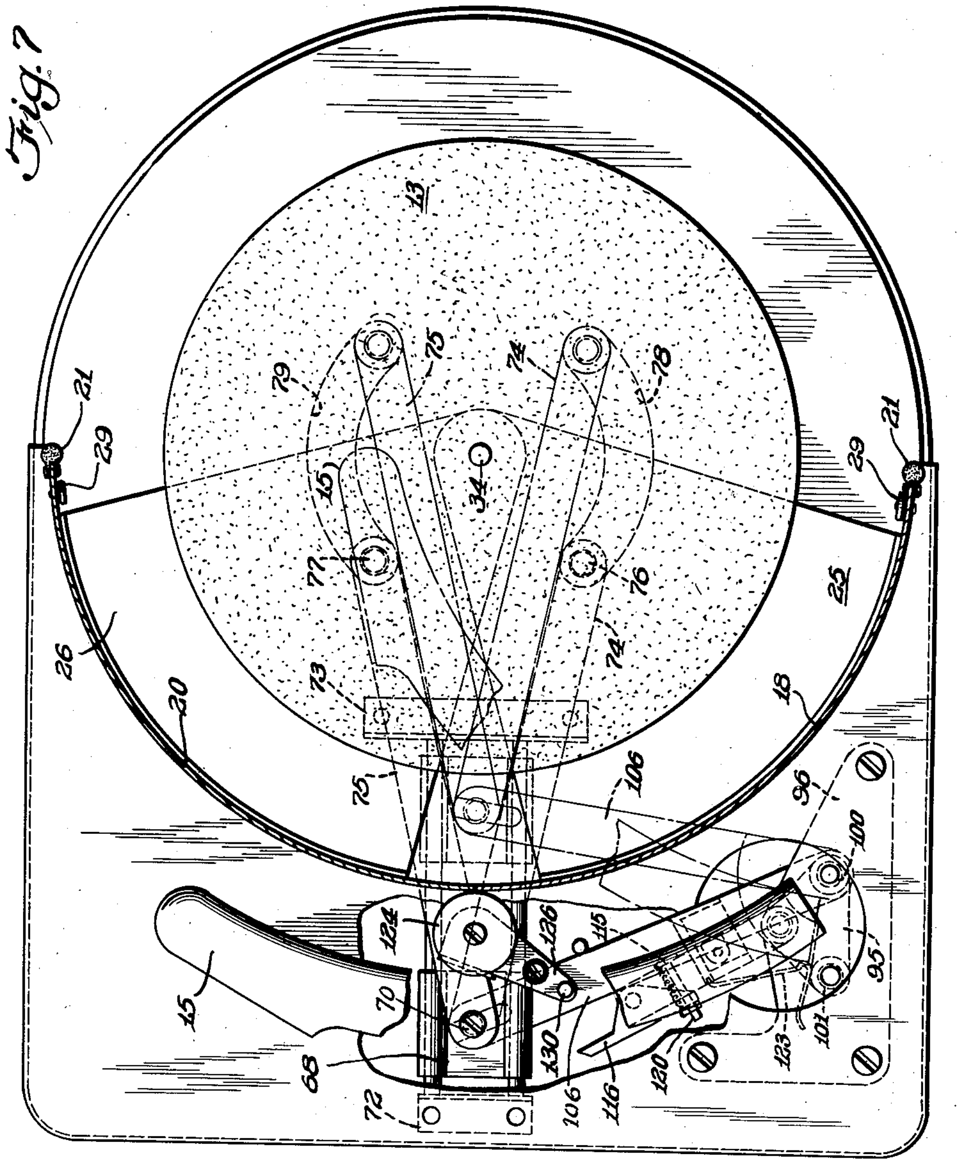
Figure 7 is a plan view illustrating an embodiment of phonograph mechanism with canopy means comprising the improvements of the invention, certain parts being shown in section.
Figures 13, 14:
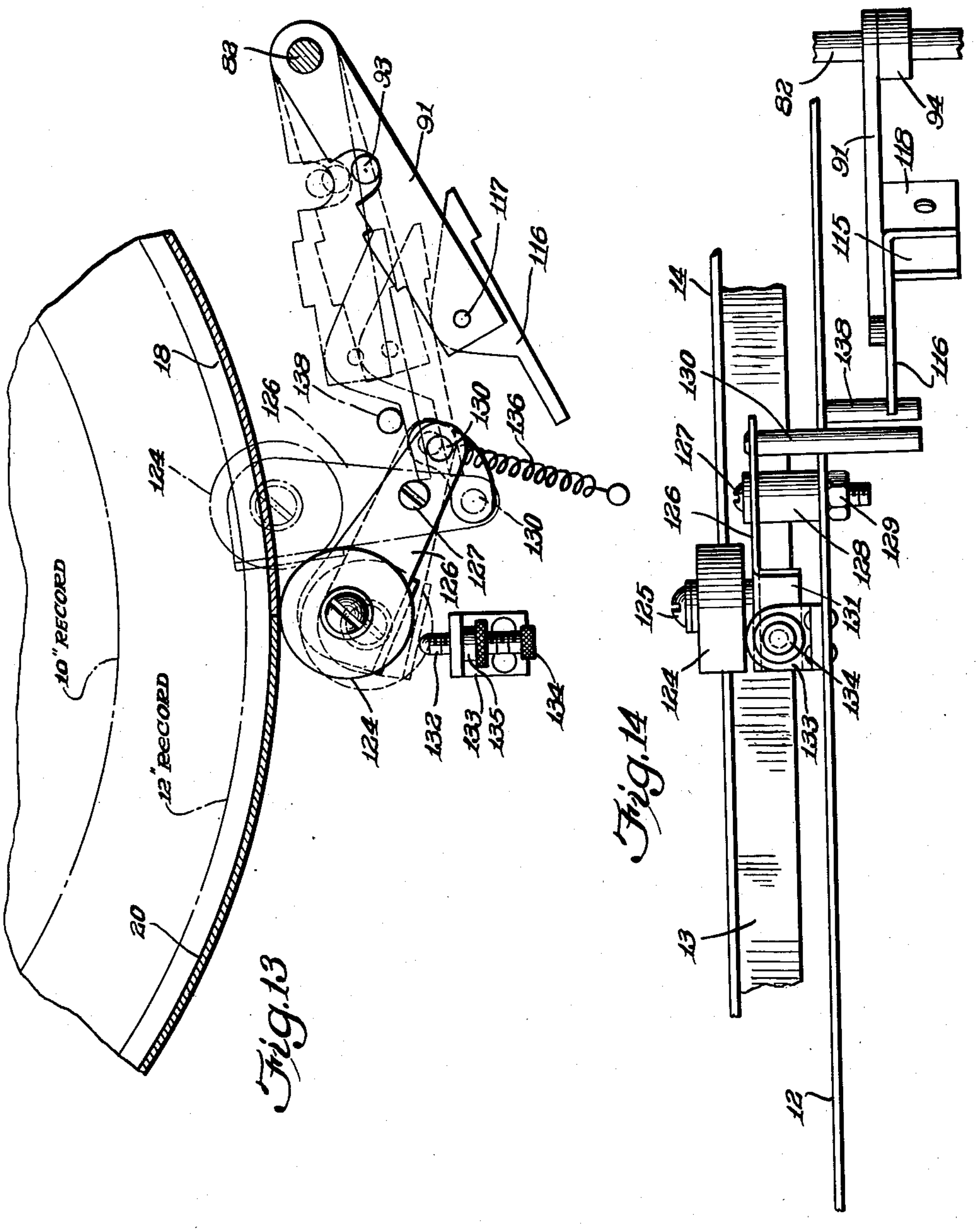
Figure 13 is a schematic view in plan elevation illustrating operation of the means for locating the tone arm for playing a ten or twelve inch record.
Figure 14 is a fragmentary sectional view showing the various elements of Figure 13 in normal position.

Referring to Figure 7, it will be observed that when the canopy is open or in non-playing position a rubber roller 124 is in contact with the exterior of the canopy sections. The roller 124 is rotatably secured by screw 125 to arm 126 which is pivoted at 127, Figure 14. The said stud 127 extends through the arm and through the spacing collar 128 and then through partition 12 to depend below the same. The stud is retained by nut 129. The end of arm 126 opposite roller 125 carries the depending pin 130 and in certain positions of arm 126 the pin 130 is located in the path of the control member 116, whereas, in other positions of arm 126 the said pin is not in the path of control member 116. The arm 126 adjacent the roller is formed with a depending flange 131, the same providing a stop having coaction with the adjusting screw 132 carried by the bracket 133, Figure 13. The screw 132 is provided with a knurled end 134 to facilitate adjustment of the screw and the same is locked in adjusted position by nut 135. The coil spring 136 has connection with the arm 126 adjacent pin 130 so as to yieldingly bias the arm in a clockwise direction, Figure 13, retaining roller 124 up against the canopy sections when the sections are closed. Upon opening of the canopy sections for playing a record supported by the turntable 13, Figure 14, the roller 124 will be yieldingly biased in a direction to contact the edge of said record as shown, provided said record is a twelve inch record. As a result the positioning of arm 126 is such as to locate pin 130 in the path of the control member 116. In the event a ten inch record is supported by the turntable, the roller will not engage the edge of the same and thus the arm 126 will be so positioned by spring 136 as to locate pin 130 out of the path of control member 116. The several positions of control member 116, arm 126 and associated parts are illustrated in Figure 13.

Operation of the phonograph mechanism of the invention for playing a twelve inch record will now be described. Since magnet 55 is included in the control circuit which also includes the motor for rotating the turntable 13, it will be understood that energization of the turntable motor will energize said magnet, whereupon lever 42 is caused to rotate friction wheel 52 into driving relation with gear wheel 38. Rotation of the turntable causes rotation of said gear wheel and through the driving connections the control disc 46 is rotated to effect reciprocating movement of carriage 68 and oscillating movement of the canopy sections 18 and 20 in a direction to cause the canopy sections to close. In other words, with the canopy sections in open position they are located between the turntable and the tone arm, providing access to the turntable but preventing access to the tone arm so that protection is provided for the tone arm during non-playing periods. Immediately upon the start of a playing period the canopy sections are caused to close and as a result of this closing action protection is provided for the record and the tone arm during playing periods.

Opening action of the canopy sections will free roller 124 which is yieldingly biased in a direction to move into contact with the record supported by the turntable. For a twelve inch record the roller 124 will be caused to contact the edge of the same and thus arm 126 will be so positioned as to locate pin 130 in the path of the control member 116. Automatically with opening of the canopy sections the arm 106 is actuated in a direction to move away from pin 93 but the pin is retained in contact therewith by tension applied to lever 91 by the flat spring 123. This action effects a returning movement of the tone arm in elevated position toward the turntable and it is only necessary to predetermine the extent of movement of lever 91 in a returning direction in order to locate the tone arm for a ten or twelve inch record. This is accomplished by pin 130 which has been located in the path of control member 116. The control member contacts the pin and lever 91 continues to move under the tension of flat spring 123 until arm 126 has rotated counterclockwise to an extent to cause flange 131 to contact adjusting screw 132. By adjustment of said screw 132 precise location of the tone arm for a twelve inch record can be effected. After this has taken place lever 91 is held against further rotation and rod 82 is still in elevated position, holding the tone arm out of contact with the record. Continued movement of arm 106 eventually releases rod 82 and the same is lowered to deposit the tone arm on the record.

Upon the lowering of rod 82 pin 93 is correspondingly lowered so that the interlocking relation which the pin 93 has in elevated position with lever 91 is discontinued and thus the rod 82 and tone arm are free to move over the record during playing of the same.

When a ten inch record is placed on the turntable for playing, the mechanism for closing the canopy sections operates as previously described. The roller 124 is accordingly released and arm 126 oscillates under tension of spring 136 to the full extent of its movement in a clockwise direction since roller 124 cannot contact the edge of a ten inch record. Control member 116 and lever 91 are thus free to move the full extent of their movement since pin 130 is not located in the path of control member 116. Said member continues to move until it contacts stop 138. This locates rod 82 in a position where tone arm 15 is properly located over a ten inch record and upon lowering of rod 82 the tone arm is deposited on the record for playing the same. For adjusting the tone arm for a ten inch record the adjusting screw 120 is employed since adjustment of this screw will vary the position of control member 116 on the lever 91.

Referring again to Figure 11, lever 91 remains stationary during the playing of a record in whatever position it may be located, depending on whether a ten or twelve inch record is being played. However, lever 90 is shown in Figure 11 in the position it assumes when the playing of a record is finished and the parts are about to be returned to initial position. It will be observed that pin 93 has moved a distance from detent 113 which is the result of movement of the tone arm over the record during playing of the same. When the playing period is finished lever 90 is so located that the rear extension 140 effects closing of a return switch whereby the mechanism is actuated to return the tone arm and associated parts to their initial position. The rear extension 140 carries an adjustable set screw 141 which is adapted to contact the actuating member of a pair of switch contacts 142, the said switch contacts being included in the electric circuit with the magnet 55 and switch contacts 64. Therefore, with the closing of switch contacts 142, the magnet 55 will be again energized to attract armature 54 and oscillate lever 42 in a counter-clockwise direction to thereby cause friction wheel 52 to engage the gear wheel 38. The control disc 46 is thus rotated and actuation of switch member 62 will close the contacts 64, maintaining the magnet 55 energized notwithstanding that contacts 142 open upon return movement of the lever 90. Rotation of the control disc for a half revolution will produce rearward movement of the carriage 68 and opening of the canopy sections 18 and 20. Simultaneously with rearward movement of carriage 68 the arm 106 will be oscillated in a counter-clockwise direction, Figure 11, to locate the pin 93 under detent 113 and to also elevate rod 82 to lift the tone arm from the record. As arm 106 continues to rotate in a counter-clockwise direction the tone arm is maintained elevated and returned to its position of rest.

Operation of the various parts as above described is controlled by the half revolution of the control disc 46 and when carriage 68 has been located in its extreme rearward position the notch 60 will align with switch member 62, allowing said switch member to drop into the notch, thereby opening the switch contacts 64 and de-energizing magnet 55. With the de-energization of magnet 55 the parts come to rest and further operation to cause playing of the record can only be started by the operator by pushing the set button to again energize the magnet 55.

The invention is not to be limited to or by details of construction of the particular embodiment thereof illustrated by the drawings as various other forms of the device will of course be apparent to those skilled in the art without departing from the spirit of the invention or the scope of the claims.

What is claimed is:

1. In phonograph mechanism, in combination, a turntable having a center shaft journalled for rotation on a vertical axis, canopy means including arcuate sections concentrically disposed with respect to the turntable and having movement about the center shaft as an axis to and from an open and closed position, a tone arm for playing a record placed on the turntable, means mounting the tone arm for oscillating movement from a position of rest to a position over the turntable and return, and mechanism for actuating the tone arm and the said canopy means in predetermined relation with each other.

2. In phonograph mechanism, in combination, a cabinet providing a horizontal supporting surface, a turntable having a center shaft, means provided by the supporting surface for journalling the center shaft on a vertical axis, a tone arm for playing a record placed on the turntable, means mounting the tone arm for oscillating movement from a position of rest to a position over the turntable and return, canopy means substantially semi-circular in extent and comprising two arcuate sections concentrically disposed with respect to the turntable, said arcuate sections having oscillating movement on the supporting surface with respect to the center shaft as an axis, mechanism for effecting oscillating movement of the arcuate sections to and from open and closed positions, and means for actuating said mechanism and for oscillating the tone arm in predetermined relation with each other.

3. In phonograph mechanism, in combination, a turntable having a center shaft journalled for rotation on a vertical axis, a tone arm for playing a record on the turntable, means mounting the tone arm for oscillating movement from a position of rest to a position over the turntable and return, canopy means substantially semi-circular in extent and including arcuate sections disposed concentrically with respect to the turntable and supported for movement about said vertical axis to and from open and closed positions, means for actuating said arcuate sections including a reciprocating member, and other means for oscillating the tone arm and for elevating and lowering the tone arm with respect to said record, said other means operating in synchronism with the movement of said reciprocating member.

4. In phonograph mechanism, in combination, a turntable having a center shaft journalled for rotation on a vertical axis, a tone arm for playing a record on the turntable, means located rearwardly of the turntable for mounting the tone arm for universal movement whereby the tone arm may oscillate to swing over the turntable and return and may move vertically for lifting and lowering movement with respect to said record, canopy means substantially semi-circular in extent and including arcuate sections disposed concentrically with respect to the turntable and adapted to move about said vertical axis to and from open and closed positions, said arcuate sections in open position being located in front of the turntable and in closed position being located rearwardly of the turntable between the same and the tone arm, means for actuating the said arcuate sections including a reciprocating member, and other means for oscillating the tone arm and for elevating and lowering the same with respect to the record, said other means operating in synchronism with the movement of said reciprocating member.

5. In phonograph mechanism, in combination, a turntable having a center shaft journalled for rotation on a vertical axis, a tone arm for playing a record on the turntable, means located rearwardly of the turntable for mounting the tone arm for universal movement whereby the tone arm may oscillate to swing over the turntable and return and may move vertically for lifting and lowering movement with respect to said record, canopy means substantially semi-circular in extent and including two arcuate sections disposed concentrically with respect to the turntable and adapted to move about said vertical axis to and from open and closed positions, said arcuate sections in closed position being located in front of the turntable and in open position being located rearwardly of the turntable between the same and the tone arm, means for actuating said arcuate sections including a reciprocating member, driving means for reciprocating said member, other means for oscillating the tone arm and for raising and lowering the same with respect to the record, said other means including a rod mounted for rotation about a vertical axis and for movement vertically, and mechanism receiving actuation from said reciprocating member for effecting raising and lowering movement of the rod and rotation of the same.

6. In phonograph mechanism, in combination, a turntable, a tone arm for playing a record on the turntable, means mounting the tone arm for oscillating movement from a position of rest to a position over the turntable and return, canopy means including a plurality of sections supported for arcuate movement concentric with the turntable and adapted to move to and from open and closed positions with respect thereto, means for actuating the sections including a reciprocating member, other means for oscillating the tone arm and for elevating and lowering the same with respect to the record including a rod mounted for rotation and for movement in an axial direction, and an oscillating arm actuated by movement of the reciprocating member for effecting axial movement of the rod and rotation of the same.

7. In phonograph mechanism, in combination, a turntable, a tone arm for playing a record on the turntable, means mounting the tone arm for oscillating movement from a position of rest to a position over the turntable and return, canopy means including a plurality of sections supported for arcuate movement concentric with the turntable and adapted to move to and from open and closed positions with respect thereto, said sections in open position being located in front of the turntable and in closed position being located rearwardly of the turntable between the same and the tone arm, means for actuating the said sections including a reciprocating member, other means for oscillating the tone arm and for elevating and lowering the same with respect to the record including a rod mounted for rotation about a vertical axis and for movement vertically, and an oscillating arm actuated by said reciprocating member for effecting vertical movement of the rod and rotation of the same.

8. In phonograph mechanism, in combination, a turntable, a tone arm for playing a record on the turntable, a universal mounting for the tone arm whereby the same may oscillate from a position of rest to a position over the turntable and return and may move vertically for elevating and lowering the tone arm with respect to the record on the turntable, canopy means including a plurality of sections supported for arcuate movement concentric with the turntable and adapted to move to and from open and closed positions with respect thereto, means for actuating said sections including a reciprocating member, mechanism for effecting movement of the tone arm from said position of rest to a playing position with respect to said record, said mechanism holding the tone arm elevated when in said position of rest and lowering the tone arm when the same has moved to said playing position, and means operating said mechanism in synchronism with the movement of said reciprocating member.

9. In a phonograph mechanism, in combination, a turntable, a tone arm for playing a record on the turntable, a universal mounting for the tone arm whereby the same may oscillate from a position of rest to a position over the turntable and return and may move vertically for elevating and lowering the tone arm with respect to said record, canopy means including a plurality of sections having arcuate movement concentric with the supporting surface of the turntable to and from open and closed positions with respect thereto, means for actuating said sections including a reciprocating member, mechanism for effecting said oscillating movement of the tone arm and for elevating and lowering the tone arm, said mechanism holding the tone arm elevated when in said position of rest and lowering the tone arm when the same has oscillated in one direction to a playing position over the record, an oscillating member having movement in predetermined relation to movement of the reciprocating member for operating said mechanism, and other means for predetermining said playing position depending on the size of the record on the turntable.

BENEDICT R. KAMLER.

REFERENCES CITED

The following references are of record in the file of this patent:

UNITED STATES PATENTS

| Number | Name | Date |
|---|---|---|
| 1,256,025 | Kolby | Feb. 12, 1918 |
| 1,475,237 | Miller | Nov. 27, 1923 |
| 1,711,666 | Adams | May 7, 1929 |
| 2,104,032 | Green | Jan. 4, 1938 |
| 2,532,555 | Kamler | Dec. 5, 1950 |